(12) United States Patent  
Walker

(10) Patent No.: US 7,104,388 B2
(45) Date of Patent: Sep. 12, 2006

(54) CONVEYOR SYSTEM FOR STACKED PRODUCT

(75) Inventor: Eugene W. Walker, Moxee, WA (US)

(73) Assignee: ARR Tech, Inc., Yakima, WA (US)

( * ) Notice: Subject to any disclaimer, the term of this patent is extended or adjusted under 35 U.S.C. 154(b) by 229 days.

(21) Appl. No.: 10/926,750

(22) Filed: Aug. 26, 2004

(65) Prior Publication Data

US 2006/0054463 A1   Mar. 16, 2006

(51) Int. Cl.
B65G 47/26 (2006.01)

(52) U.S. Cl. ............... 198/433; 198/412; 198/468.8; 198/607

(58) Field of Classification Search ........... 198/358, 198/412, 413, 418.1, 418.2, 433, 468.8, 575, 198/576, 577, 606, 607, 817; 414/790; 271/259, 69, 184, 189
See application file for complete search history.

(56) References Cited

U.S. PATENT DOCUMENTS

| | | | |
|---|---|---|---|
| 3,297,174 A * | 1/1967 | Letchworth | 414/790.3 |
| 3,366,253 A * | 1/1968 | Walchhuter | 414/794.4 |
| 3,456,773 A * | 7/1969 | Titmas, Jr. | 198/370.09 |
| 4,006,831 A | 2/1977 | Jimenez | |
| 4,262,792 A | 4/1981 | Davies | |
| 4,431,104 A | 2/1984 | Orlowski et al. | |
| 4,516,210 A | 5/1985 | Dahlke | |
| 4,517,784 A | 5/1985 | Beckett | |
| 4,530,632 A | 7/1985 | Sela | |
| 4,926,999 A * | 5/1990 | Fauth et al. | 198/358 |
| 4,934,687 A * | 6/1990 | Hayden et al. | 271/202 |
| 4,951,803 A | 8/1990 | Dorner et al. | |
| 4,962,841 A * | 10/1990 | Kloosterhouse | 198/370.09 |
| 5,035,134 A | 7/1991 | Fisch | |
| 5,253,762 A | 10/1993 | Duncan | |
| 5,271,489 A | 12/1993 | Helmstetter | |
| 5,388,746 A | 2/1995 | Hatchell et al. | |
| 5,401,160 A * | 3/1995 | Bellettato | 425/397 |
| 5,611,418 A | 3/1997 | Helmstetter | |
| 5,711,179 A | 1/1998 | Kimball | |
| 5,720,593 A | 2/1998 | Pleake | |
| 5,799,770 A * | 9/1998 | Radewagen | 198/432 |
| 5,842,557 A | 12/1998 | Montemayor et al. | |
| 6,053,695 A | 4/2000 | Longoria et al. | |
| 6,168,370 B1 * | 1/2001 | Longoria et al. | 414/793.1 |
| 6,209,708 B1 | 4/2001 | Philipp et al. | |
| 6,332,749 B1 | 12/2001 | Garcia-Balleza et al. | |
| 6,347,697 B1 * | 2/2002 | Ouellette et al. | 198/358 |
| 6,370,447 B1 * | 4/2002 | Miyazaki | 700/230 |

(Continued)

Primary Examiner—Douglas Hess
(74) Attorney, Agent, or Firm—Christensen, O'Connor, Johnson, Kindness PLLC

(57) ABSTRACT

An apparatus and method for conveying stacked product from an infeed conveyor that conveys the product in multiple rows and at irregular intervals onto a transverse outfeed conveyor, wherein the product is in a single row and spaced at regular intervals, wherein the regular row may include gaps or empty spaces. The apparatus includes an intermediate conveyor that is disposed between the infeed conveyor and the outfeed conveyor. The intermediate conveyor overlaps and is interleaved with the infeed conveyor. A number of lift assemblies are disposed below the infeed conveyor and are adapted to selectively lift the product to suspend its forward progress and lower the product to achieve a desired arrival at the outfeed conveyor. In a preferred embodiment, the intermediate conveyor has a faster belt speed than the infeed conveyor, such that the stacked product accelerates on the overlapped portion of the infeed and intermediate conveyors.

21 Claims, 7 Drawing Sheets

U.S. PATENT DOCUMENTS

| | | |
|---|---|---|
| 6,454,518 B1 | 9/2002 | Garcia-Balleza et al. |
| 6,513,649 B1 | 2/2003 | Lauzon et al. |
| 6,585,477 B1 | 7/2003 | Lawrence |
| 6,634,483 B1 | 10/2003 | Longoria |
| 6,845,860 B1 * | 1/2005 | Walker ........................ 198/433 |
| 6,907,978 B1 * | 6/2005 | Evans et al. ........... 198/370.09 |
| 6,983,580 B1 * | 1/2006 | Layton et al. ................. 53/530 |
| 2005/0092581 A1 * | 5/2005 | Walker |

* cited by examiner

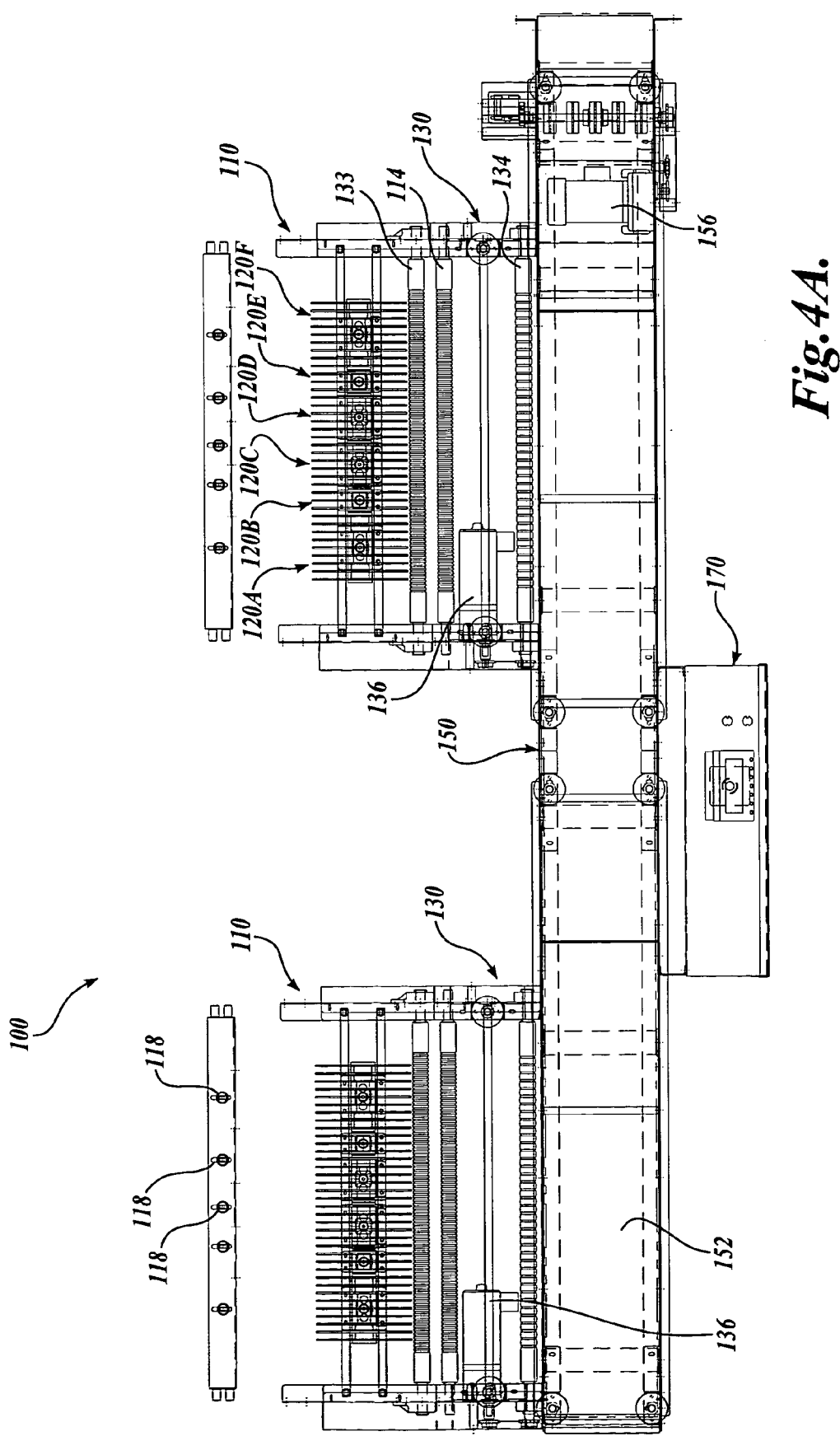

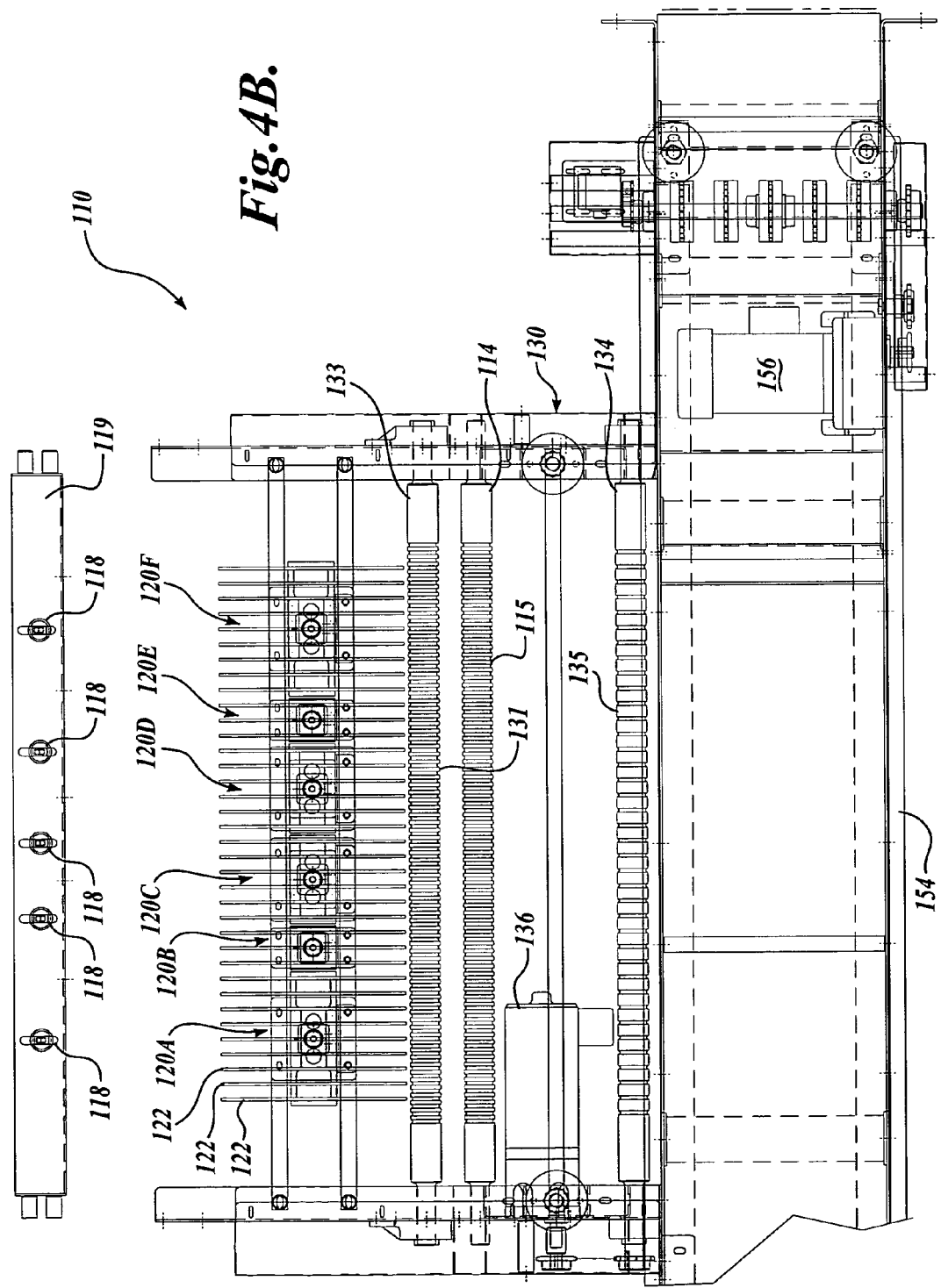

CONVEYOR SYSTEM FOR STACKED PRODUCT

FIELD OF THE INVENTION

The present invention relates to food processing equipment and, in particular, to systems for moving stacked food product in a production environment.

BACKGROUND OF THE INVENTION

It is often desirable to transport stacks of products in a continuous production environment from one processing station to the next. For example, in the production of tortillas, individual tortillas are typically formed and cooked in a continuous or semicontinuous process and are then arranged into stacks in preparation for packaging. Tortilla production is a large industry—by industry estimates, accounting for over five billion dollars in sales in 2002. The production of flat food products such as tortillas, like much of the commercial food industry, conventionally requires significant manual labor that is repetitive and boring and that may lead to injuries, such as repetitive motion injuries or injuries related to worker inattention around moving and/or hot equipment. Moreover, the use of manual labor for repetitive tasks under utilizes resources and is economically inefficient. For these reasons, the food production industry has turned increasingly to technology to eliminate or reduce tasks that are amenable to automation, freeing the workforce for more appropriately challenging tasks.

The automated transport of stacks of flat products, however, presents special challenges. For example, flour and corn tortillas are typically cooked and stacked in a continuous and flexible process resulting in multiple rows of tortillas that proceed through an oven and then a stacking process. This process results in multiple rows of stacks of tortillas, spaced at irregular intervals, on one or more relatively wide conveyors. Typically, the tortilla stacks include 10 to 20 tortillas (or more) that are then ready to be inserted into bags for retail markets. Examples of counting, inspecting, and/or stacking apparatuses are disclosed in U.S. Pat. No. 4,530,632, issued to Sela, and U.S. Pat. No. 5,720,593, issued to Pleake, both of which are hereby incorporated by reference. In the apparatus disclosed by Pleake, the tortillas are fed from a conveyor into a trajectory guide and flung through a known flight trajectory to a stacking mechanism. A shaker jostles the stack of tortillas on a movable stack plate, which is lowered to deposit the stack onto a baseplate, wherein a stack removal device moves the stack of tortillas away from the stacking assembly. The stacks of tortillas, disposed in multiple rows or lanes, are transported to a pickup area where they may be manually bagged or moved into a single row on a conveyor for delivery to packaging. Bagging systems are known that will automatically process a single row of stacks of tortillas on a conveyor, automatically inserting the stacks into bags.

The latter manual step is repetitive and inefficient. However, heretofore it has been necessary to perform this task manually for several reasons. First, the stacks of tortillas exit the stacking apparatus in multiple rows or lanes and at irregular intervals. The irregularity in the stack spacing may be attributed to placement of the tortillas prior to cooking, inspection, removal of defective products, and similar factors. Also typically, the size of the stacks, as well as the diameter of the tortillas, may vary for a given apparatus. That is, a particular cooking and stacking apparatus may be set up to produce smaller or larger tortillas, and/or to permit the number of tortillas per stack to be selected. It will be appreciated that it is intrinsically more difficult to move stacked product in an automated manner due to the tendency of the stacks to tip over (or slidably spread out) due to inertial forces and the like.

Recognizing the need for an apparatus for automatically transferring stacks of tortillas from a multi-row stacker to a single-row conveyor, U.S. Pat. No. 6,454,518, to Garcia-Balleza et al., discloses an apparatus wherein stacks of tortillas are dropped from an upper conveyor onto conveyor blocks disposed on a lower conveyor. Although the disclosed device is an improvement in the art, a disadvantage of the invention taught therein is that the stacks of tortillas may become de-stacked due to the abrupt drop onto a moving block. Another disadvantage is that the disclosed system does not appear to be amenable to use with more than one size of tortilla. Garcia-Balleza et al. shows many conventional aspects of suitable conveyor systems and is therefore also incorporated herein by reference.

A disadvantage of prior art systems for transporting stacks of product is that the stacks tend to come apart or spread out as they are transported from one conveyor to another and/or abruptly change direction or speed. De-stacked product interferes with the automation production efficiencies and generally requires manual monitoring and processing to intercept and restack or discard such product.

Therefore, there remains a need for an apparatus that automatically transports stacks of flat product and transfers stacked product arriving in multiple rows onto a conveyor in a single row, wherein the integrity of the stacked products is substantially maintained.

SUMMARY OF THE INVENTION

The present invention is directed to a conveyor system that receives product—for example, stacks of tortillas—in multiple rows and at irregular intervals and transfers the stacks onto a second conveyor, such that the product is arranged in a single row and at regular intervals on the second conveyor. In an embodiment of the invention, the conveyor system includes an infeed conveyor having a conveyor belt defined by a plurality of parallel, spaced-apart belts. The infeed conveyor may be, for example, a portion of a stacking apparatus for a tortilla stacker. A number of lift assemblies are disposed below the infeed conveyor and are operable to selectively lift product from the infeed conveyor as it passes over the lift assembly, thereby arresting the product's forward progress, and to lower product back onto the conveyor at a desired time. The lift assemblies include a number of lift members that are positioned and spaced to extend between belts of the infeed conveyor. An intermediate conveyor is provided that overlaps the infeed conveyor. The intermediate conveyor also has a conveyor belt defined by a plurality of parallel, spaced-apart belts, with one end of the belts interleaved with the belts of the infeed apparatus. An outfeed conveyor is provided at the distal end of the intermediate conveyor and is oriented transversely to the intermediate conveyor. The outfeed conveyor is adapted to receive the product from the intermediate conveyor.

In an aspect of the invention, the infeed conveyor belt speed is slower than the intermediate conveyor belt speed, such that the product accelerates on the overlapping portions of the infeed conveyor and the intermediate conveyor.

In an embodiment of the invention, the lift assemblies include an actuator that selectively moves the associated vertical members between the up position and the down position.

In an embodiment of the invention, the conveyor system also includes a control system that receives input from stack detectors disposed below the infeed conveyor and uses that information to control the movement of the lift assemblies to cause the product to arrive at the outfeed conveyor at a desired time to achieve a uniform spacing.

In another aspect of the invention, a method of transferring stacks of product from a first conveyor, wherein the stacks are in multiple rows and irregularly spaced, onto a second conveyor that is adjacent a distal end of the first conveyor, such that the stacks are deposited onto the second conveyor in a single row and evenly spaced is disclosed. The method includes the steps of detecting a stack as it arrives at a position on the first conveyor in response to the detected arrival of the stack, selectively elevating the stack above the first conveyor to suspend the stack's conveyed motion, determining when a desired open space is available on the second conveyor, and lowering the stack onto the first conveyor such that the stack will arrive at the distal end of the first conveyor approximately as the desired open space on the second conveyor arrives, such that the stack is deposited onto the second conveyor at the desired open space.

Many of the novel features of the invention are set forth in the claims. The inventor's currently preferred best mode for practicing the invention is described in detail below to aid the artisan in understanding the invention, and its advantages over the prior art.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4A is a more detailed plan view of the conveyor transfer apparatus shown in FIG. 1, with the belts of the parallel belt conveyors removed for clarity;

FIG. 4B show a fragmentary plan view of the conveyor transfer apparatus shown in FIG. 4A;

DETAILED DESCRIPTION OF THE PREFERRED EMBODIMENT

Referring now to the figures, wherein like numbers indicate like parts, a description of a currently preferred embodiment of the present invention will be described in detail to illustrate the invention and to aid the artisan in understanding the present invention.

Figure 1:
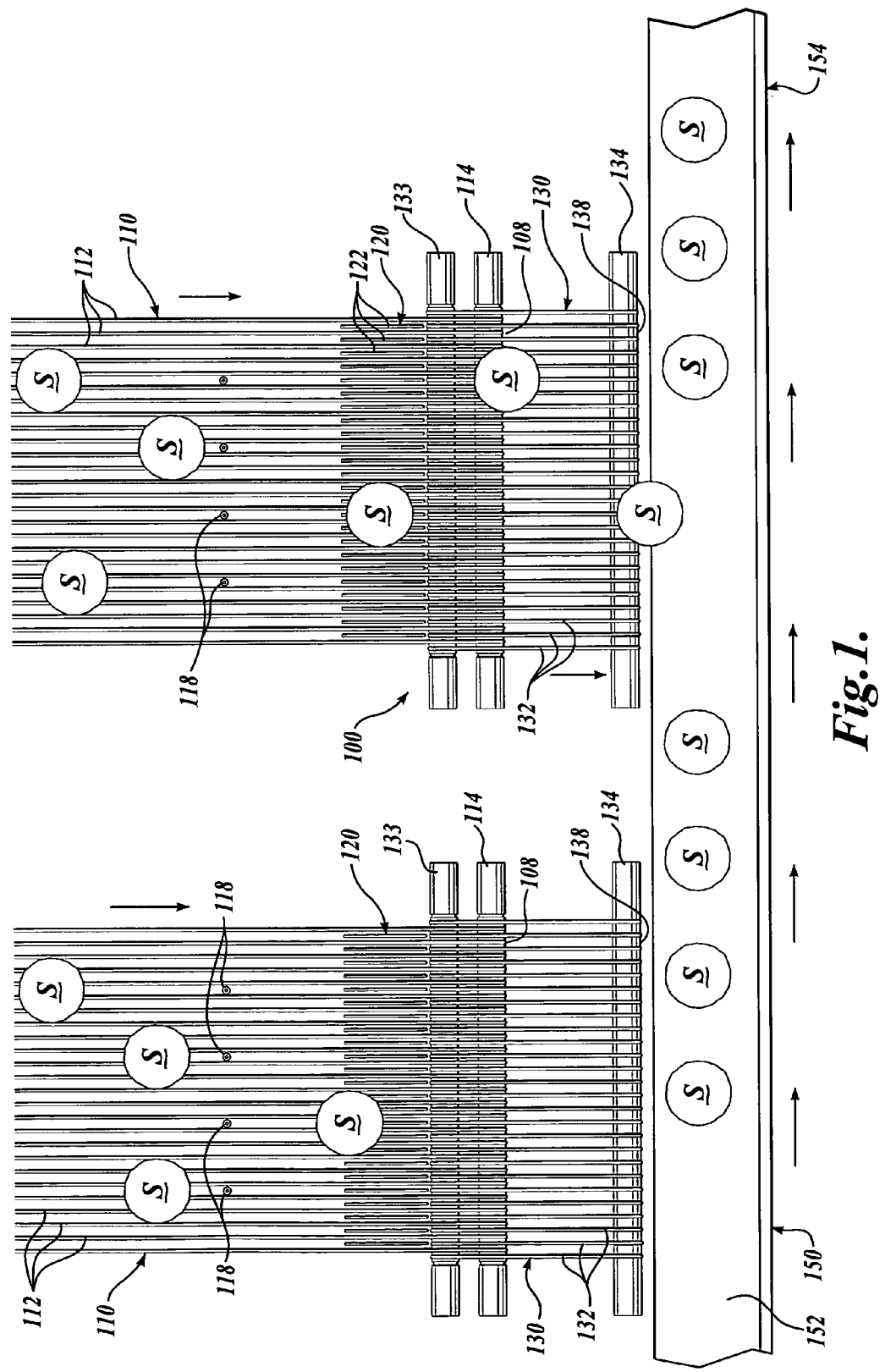
FIG. 1 is a simplified plan view of a conveyor transfer apparatus made in accordance with the teaching of the present invention.

FIG. 1 shows a simplified plan view of a banked pair of conveyor transfer apparatus 100 according to the present invention. In this embodiment the conveyor transfer apparatus 100 includes a pair of infeed conveyors 110, each infeed conveyor having an associated intermediate conveyor 130, and an outfeed conveyor 150 disposed near the distal end of the intermediate conveyors 130. The conveyor direction is indicated with arrows in FIG. 1. It is contemplated, however, that only one, or more than two, infeed conveyors 110 may alternatively be used to accommodate a particular application without departing from the present invention.

The conveyor transfer apparatus 100 receives stacks S of flat product, such as corn or flour tortillas, from an upstream processing apparatus—for example, from the out-feed conveyor of a counter/stacker apparatus (not shown). In conventional tortilla production facilities, individual tortillas are typically formed in an array on a relatively wide conveyor and cooked in a continuous process as they pass through an oven. The individual tortillas are then stacked, each stack containing a desired number of tortillas. Tortilla cooking and counting/stacking apparatus are well known in the art. Although it is generally convenient and efficient to produce the tortilla stacks in multiple rows or lanes wherein the stacks are disposed at irregularly spaced intervals, such an arrangement is not generally convenient for downstream processing of the stacks, such as bagging/packaging operations. The conveyor transfer apparatus 100 of the present invention receives the stacks S arriving in multiple lanes and at irregular intervals and deposits the stacks S onto the outfeed conveyor 150 such that the stacks S are disposed in a single row and at substantially regular intervals, as discussed in detail below.

The conveyor transfer apparatus 100 includes one or more infeed conveyors 110, that may be, for example, the exit conveyors from separate stacking apparatus (not shown). The infeed conveyors 110 transport stacks S toward the single-row outfeed conveyor 150. The infeed conveyors 110 include a plurality of parallel, spaced-apart, endless-loop belts 112 that are drivably engaged by a drive mechanism having a pair of oppositely disposed, parallel shafts (only the distal shaft 114 is shown in FIG. 1). It will be appreciated that the endless loop belts 112 may be, for example, of unitary construction, or split with a link or attachment mechanism (now shown) for assembly in situ. Conveyors of the type having a plurality of parallel, spaced-apart, endless-loop belts are well known in the art, typical examples being disclosed in U.S. Pat. No. 4,006,831 and U.S. Pat. No. 4,530,632, which are hereby incorporated by reference. It will be appreciated that the parallel, spaced-apart belts 112 define a moving platform suitable for transporting the stacks S and further, that the moving platform defines parallel gaps between the belts 112.

Near the distal end 108 of the infeed conveyors 110 are a number of lift assemblies 120, each lift assembly 120 having vertical members 122 that are sized and spaced to extend between spaced belts 112 of the infeed conveyor 110 and are selectively movable between an "up" position, wherein the upper surface of the vertical members 122 is disposed above the adjacent spaced belts 112, and a "down" position wherein the upper surface of the vertical members 122 is disposed below the top of the adjacent spaced belts 112. Each lift assembly 120 is positioned to selectively lift stacks S that pass directly over the lift assembly 120 to temporarily suspend the stacks S above the infeed conveyor 110, and thereby arrest their forward progress. The lift assembly 120 then selectively lowers the stacks S back onto the infeed conveyor 110 to achieve a desired position for the stacks S. A number of stack detectors 118—for example, optical detectors—are provided below the infeed conveyors 110 and are operable to detect when a stack S is approaching a particular lift assembly 120.

Figure 2:
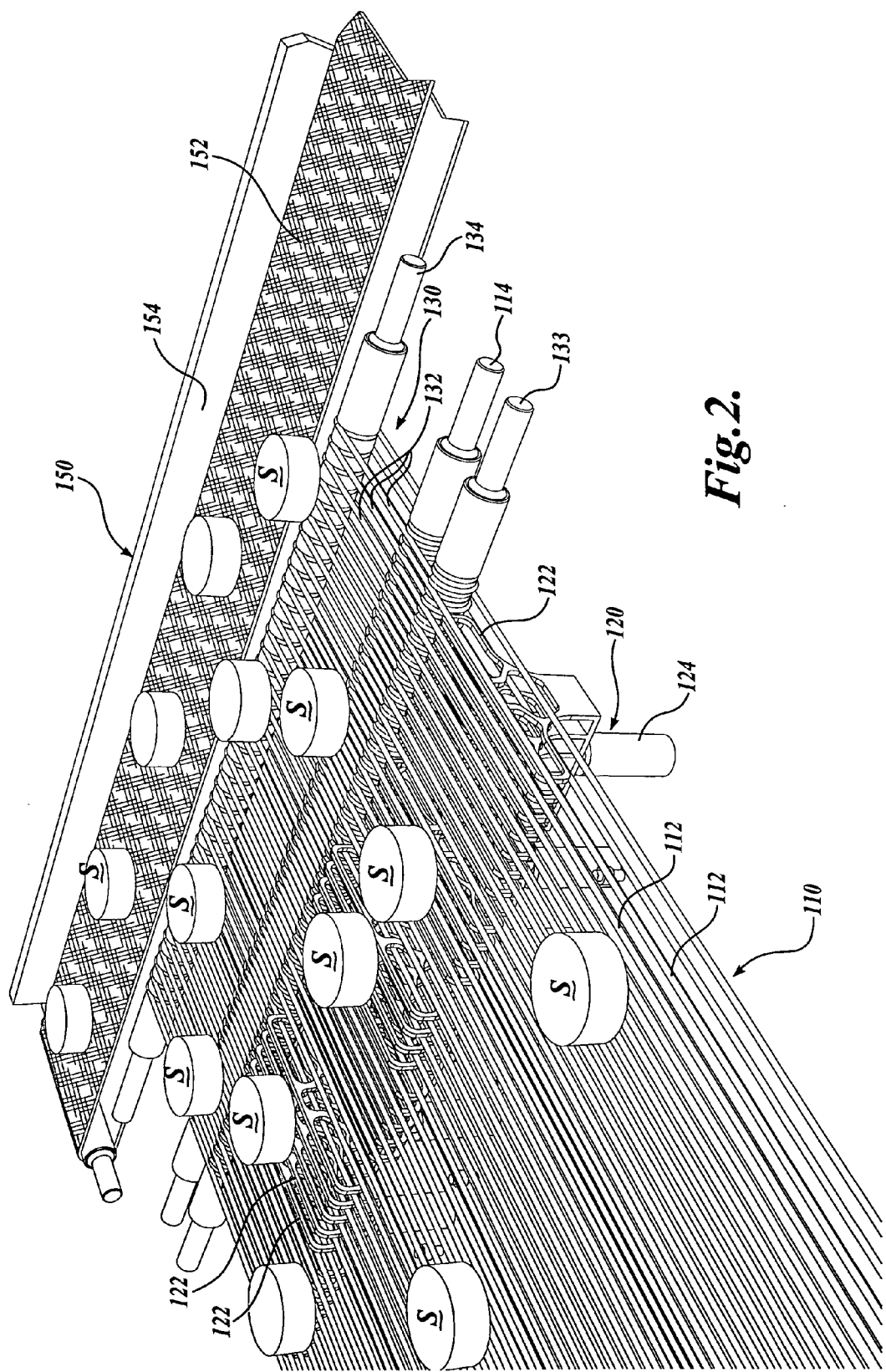
FIG. 2 is a fractional isometric view of a portion of the conveyor transfer apparatus shown in FIG. 1.

An intermediate conveyor 130 is disposed at the distal end 108 of each infeed conveyor 110 and between the infeed conveyor 110 and the outfeed conveyor 150. The intermediate conveyor 130 is similar in type to the infeed conveyor 110, having a number of parallel, spaced-apart, endless loop belts 132 that are drivably disposed on a pair of parallel shafts 133, 134. The intermediate conveyor 130 receives the stacks S from the infeed conveyor 110 and transports the received stacks S to the outfeed conveyor 150. As seen most clearly in FIG. 2, which shows a portion of the conveyor transfer apparatus 100, the intermediate conveyor 130 overlaps a distal portion of the infeed conveyor 110 with the spaced belts 132 of the intermediate conveyor 130 interleaved with the spaced belts 112 of the infeed conveyor 110. The interleaved infeed conveyor belts 112 are generally parallel to, and at the same vertical height, as the interleaved intermediate conveyor belts 132. The lift assemblies 120 are located generally just upstream of the intermediate conveyor 130.

Referring again to FIG. 1, the outfeed conveyor 150 is located near the distal end 138 of the intermediate conveyor 130 and oriented transversely to the intermediate conveyor 130. The outfeed conveyor 150 includes a conveyor belt 152 that may be of any suitable design, as is well known in the art, such as the flexible, unitary conveyor belt shown in FIG. 1. The upper surface of the outfeed conveyor belt 152 is preferably approximately at the same height as the upper surface of the intermediate conveyor belts 132.

The outfeed conveyor belt 152 is drivably engaged by a conventional drive mechanism (not shown), as is well known in the art. In a preferred embodiment, a stationary, vertically projecting wall or backstop 154 is provided next to the distal edge of the outfeed conveyor 150. The backstop 154 is positioned to inhibit or prevent the stacks S, or portions thereof, from overshooting the outfeed conveyor 150, and/or de-stacking or falling over.

It has been found that the optimal velocity of the stacks S for reliably depositing the stacks S from the intermediate conveyor 130 onto the outfeed conveyor 150 without de-stacking the stacks S, is greater than the optimal velocity of the infeed conveyor. The actual value for the optimal velocities will depend on many factors and may be adjusted for a particular application based on past experience, trial and error, and/or engineering judgments. For example, when transporting stacks of tortillas, the optimal infeed conveyor speed and the optimal intermediate conveyor speeds may depend on the size of the tortillas, the size of the stacks, and the type of tortillas being transported. It will be appreciated that the present invention, utilizing an interleaved intermediate conveyor 130 between the infeed conveyor 110 and the outfeed conveyor 150, uniquely provides great flexibility in selecting stack conveyor speeds for different stages of transporting the stacks.

In particular, it will now be appreciated that interleaving the belts 112 of the infeed conveyors 110 with the belts 132 of the intermediate conveyors 130 avoids an abrupt velocity change, providing a velocity ramp-up—that is, a more gradual acceleration of the stacks S from the infeed conveyor 110 velocity to the intermediate conveyor 130 velocity. The gradual acceleration helps to maintain the stack integrity.

Referring again to FIG. 2, each lift assembly 120 of the disclosed embodiment includes an actuator 124 (shown in phantom in some figures, for clarity)—for example, a hydraulic, electric, or pneumatic lift that is connected to a ganged set of parallel vertical members 122. As discussed above, the actuators 124 are selectively movable between an "up" position and a "down" position. The vertical members 122 are sized and spaced such that the upper surfaces of the vertical members 122 are disposed below the top of the infeed conveyor belts 112 when the actuator 124 is in the "down" position, and the upper surfaces are disposed above the infeed conveyor belts 112 when the actuator 124 is in the "up" position. The lift assemblies 120 are operable to selectively lift the incoming stacks S to suspend their forward progress, such that the stacks S may be lowered back onto the infeed conveyor 110 at a desired time to position the stack S onto the outfeed conveyor 150 at a desired position.

Figure 3:
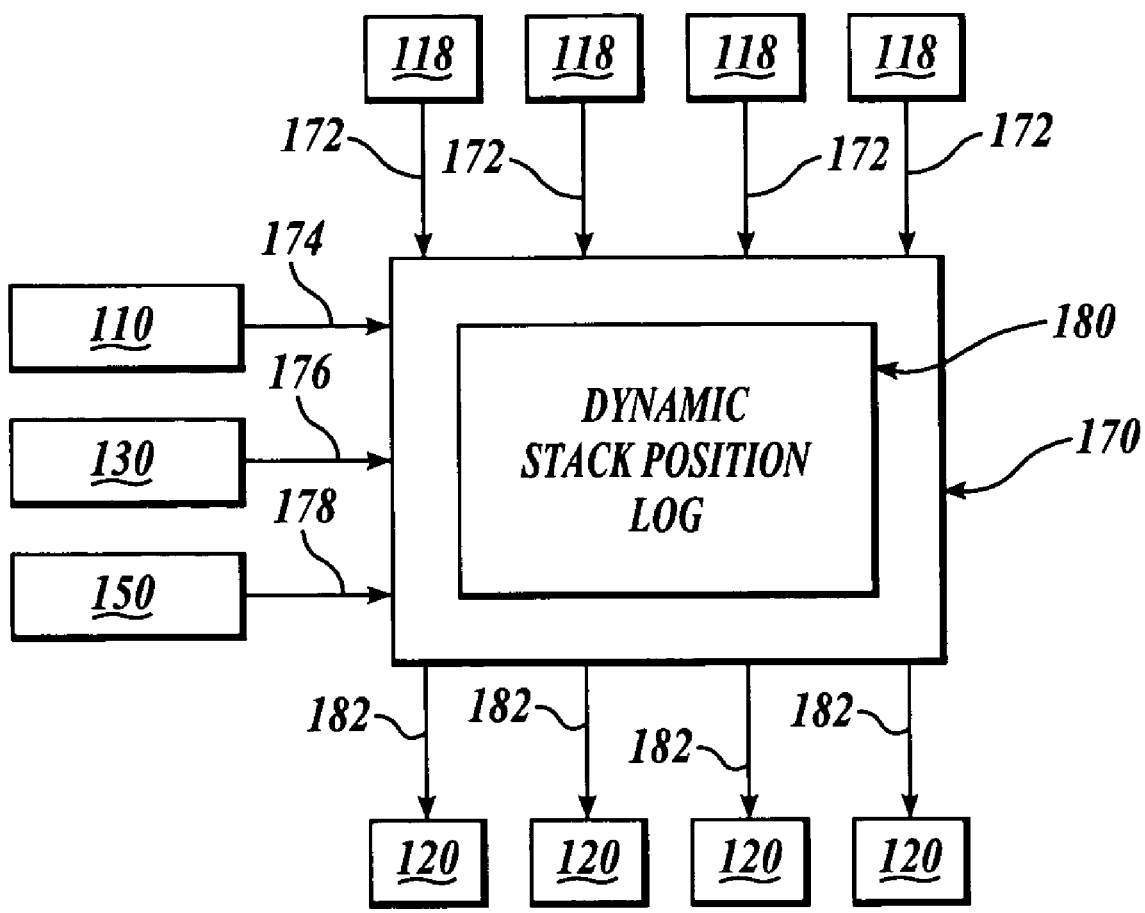
FIG. 3 is a schematic representation of the control system for the conveyor transfer apparatus shown in FIG. 1.

As shown schematically in FIG. 3, in an embodiment of the invention, a computerized controller 170 receives input signals 172 from the stack detectors 118 that are upstream of the lift assemblies 120. The controller 170 may additionally receive input signals 174, 176, 178 that indicate the belt speed of the infeed conveyor 110, intermediate conveyor 130 and outfeed conveyor 150, respectively. Clearly, if one or more of these is operated at a constant velocity, then the constant velocity may be utilized, without requiring an input from the respective device to the controller 170.

The controller 170 uses these various inputs to maintain a dynamic stack position log 180, such that the controller 170 monitors the positions of the stacks for a limited time/position on the outfeed conveyor 150. The controller 170 uses this information and the input data to generate control signals 182 to the lift assemblies 120 that control the operation of the lift assemblies 120. The controller 170, for example, may send a control signal 182 to instruct a particular lift assembly 120 to move to the "up" position upon receiving a stack detection signal 172 from a corresponding detector 118 (after a suitable and well-defined delay wherein the stack S moves directly over the lift assembly 120). Upon the approach of a desired available open position on the outfeed conveyor 150 for a stack S, the controller 170 will send a control signal 182 to the particular lift assembly 120 to move to the "down" position to reset the stack S onto the infeed conveyor 110 for transport on the intermediate conveyor 130 and onto the outfeed conveyor 150. The controller 170 will generate the signal to reset the stack S, after accounting for the transit times, such that the stack S arrives at the outfeed conveyor 150 at a desired time and position. Of course, the controller 170 also uses the lift assembly control signal information to update the relevant stack position data in the stack position log 180.

The conveyor transfer apparatus 100, therefore, receives a plurality of stacks S in multiple rows and at irregular intervals and precisely places the stacks S in a single row on the outfeed conveyor and at user-controllable, regular intervals. As shown in FIG. 1, more than one conveyor transfer apparatus 100 may be used with a single outfeed conveyor 150. It will be apparent to the artisan that the speed and stack spacing on the outfeed conveyor 150 should be such that the outfeed conveyor 150 can accommodate the maximum output from the one or more infeed conveyors 110 that are associated therewith. In general, the regularly spaced stacks S on the outfeed conveyor may include gaps in the regularly spaced stacks or empty positions on the outfeed conveyor. Such gaps in the regularly spaced rows of stacks on the outfeed conveyor 150 are typically not a significant problem for the downstream processing of the stacks.

It is also contemplated that other methods of determining when to raise and/or lower the lift assemblies 120 may be utilized, for example by using a greater number of detectors 118 rather than using the belt speeds to compute stack positions. It will also be appreciated that the stack position per se may not be maintained in the stack position log, but rather related data sufficient to determine when appropriate space is available on the outfeed conveyor 150, and when a stack is available and positioned to be moved onto the available space is all that is required. For example, the controller will generally record that a particular space on the outfeed conveyor 150 is filled upon issuance of a signal to the lift assembly 120 to lower the stack, and the corresponding lift assembly is available to receive a new stack. It is also contemplated that other mechanisms for controlling the flow of stacks on the infeed conveyor 110, upstream of the lift assemblies 120, may readily be incorporated into the present invention. For example, additional upstream lift assemblies may be utilized to better control the flow of stacks to the lift assemblies 120. It will also be apparent that the stack positions (e.g., the open/filled positions on the outfeed conveyor), will only need to be monitored generally for the portion of the outfeed conveyor transiting past the intermediate conveyors 130.

Figure 4C:
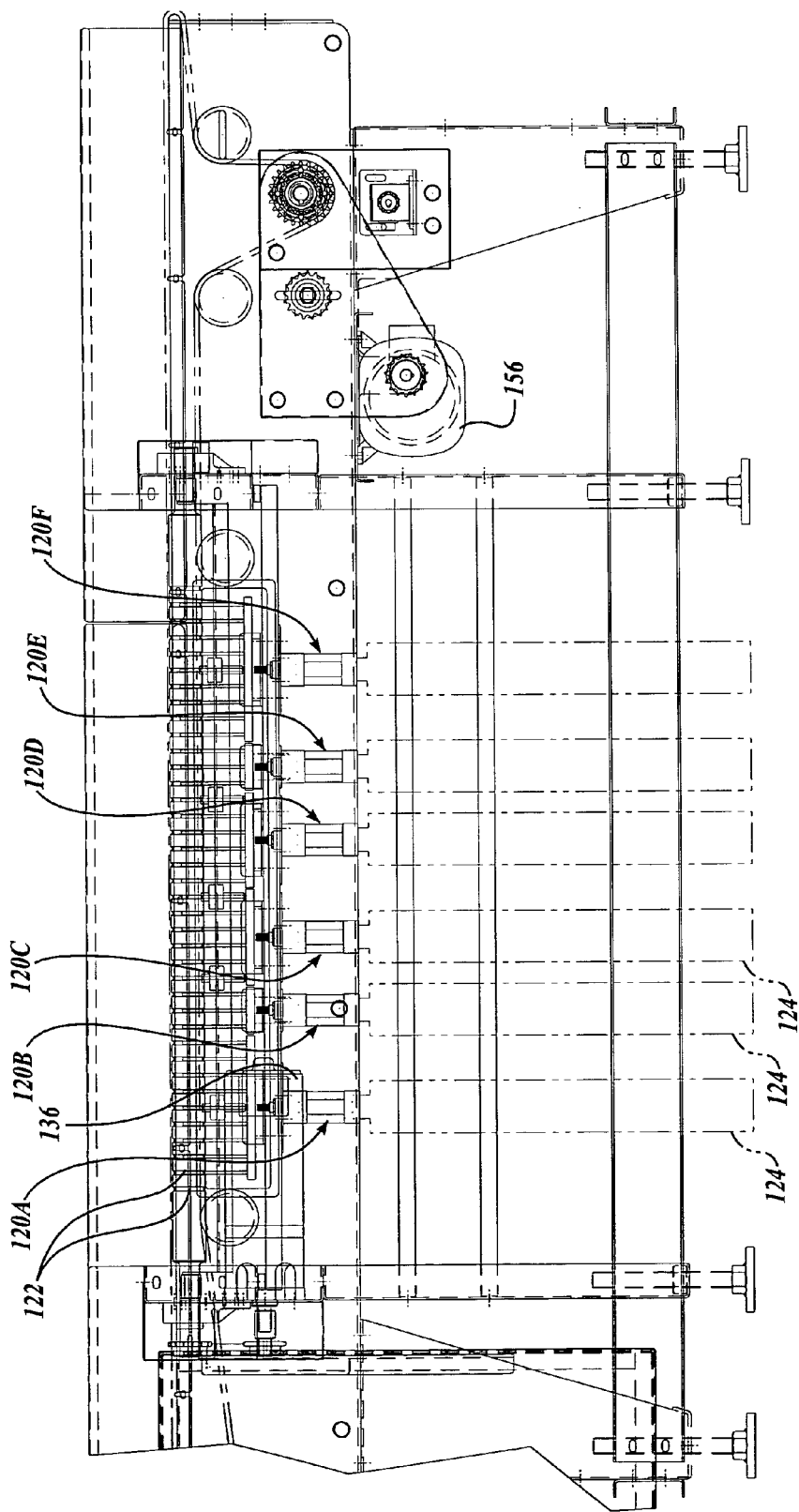
FIG. 4C shows a fragmentary front view of the conveyor transfer apparatus shown in FIG. 4A.
Figure 4D:
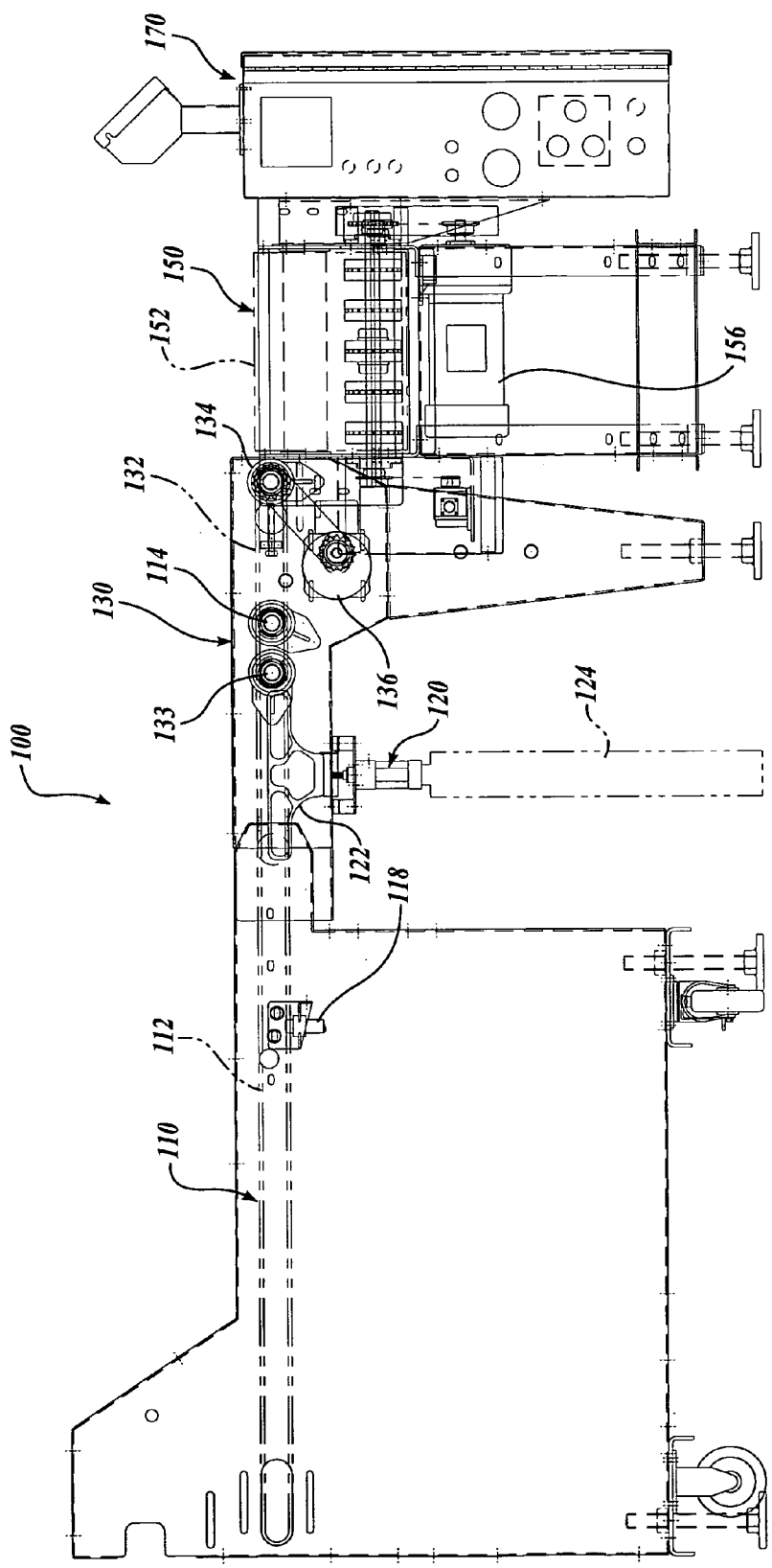
FIG. 4D illustrates a detailed side view of the conveyor transfer apparatus shown in FIG. 4A.

A more detailed view of the conveyor transfer apparatus 100 is shown in FIGS. 4A–4D, wherein FIG. 4A is a plan view of the conveyor transfer apparatus 100, FIG. 4B is a plan view of a portion of the apparatus, FIG. 4C is a front view of a portion of the apparatus, and FIG. 4D is a side view. The parallel belts 112 and 132 of the infeed conveyor 110 and the intermediate conveyor 130, respectively, are omitted from all of these figures, for clarity.

In this embodiment of the present invention, each intermediate conveyor 130 includes a separate motor assembly 136 for driving the intermediate conveyor 130. In addition, the outfeed conveyor 150 includes a separate motor assembly 156 that drivably engages the outfeed conveyor belt 152. This preferred configuration provides the operator with the greatest flexibility for adjusting the speeds of the various conveyors to optimize the performance of the conveyor transfer apparatus 100. However, it is also contemplated that a single motor assembly, or only two motor assemblies, may alternatively be used with other coupling hardware to drive more than one conveyor, as is known in the art.

As seen most clearly in FIGS. 4B and 4C, in this more detailed view, each infeed conveyor 110 includes six lift assemblies indicated by 120A–120F, the six lift assemblies having different transverse lengths. In particular, the ratios of the transverse lengths of the six lift assemblies 120A–129F are approximately 3:1:2:2:1:3. The lift assemblies are adapted to be operable in various combinations in order to accommodate various row configurations. The row configurations may be adapted, for example, to accommodate different diameters of stacked product. For example, smaller diameter stacks of product may be arranged on the infeed conveyors generally in four rows, medium diameter stacks may be arranged in three rows, and larger diameter stacks may arrive in two rows. It will be apparent from studying the figures that by combining or ganging lift assemblies 120B and 120C together, and ganging lift assemblies 120D and 120E together, the lift assemblies may operate as four approximately equally sized lift assemblies (wherein lift assemblies 120A and 120F operate singly). If a larger diameter product is to be processed, the operator can gang together lift assemblies 120A/120B and 120C/120D and 120E/120F, such that the system operates effectively with three lift assemblies. If even larger diameter stacks are to be transported, the operator can gang together lift assemblies 120A/120B/120C and 120D/120E/120F, such that the lift assemblies operate effectively as two larger lift assemblies.

It will also be appreciated that from FIG. 4B that in this embodiment of the invention five stack detectors 118 are provided and are spaced such that the incoming stacks may be detected in any of these modes of operation. That is, the detectors 118 are positioned such that incoming stacks can be detected for the different sizes of products, arriving in two, three or four rows.

Regarding another aspect of the invention, as seen most clearly in FIG. 4B, the shafts 114, 133, 134 for the parallel belt type conveyors (the infeed conveyors 110 and the intermediate conveyors 130) include circumferential grooves 115, 131, 135 respectively, that accommodate and position the parallel belts 112, 132 (belts omitted for clarity from FIGS. 4A–4D, but shown in FIGS. 1 and 2) as is conventional for this type of conveyor. However, for the present invention, the distal shaft 114 of the infeed conveyor 110 and the proximal shaft 133 of the intermediate conveyor 130 cooperatively delineate the overlapping portions of the infeed conveyor 110 and intermediate conveyor 130. These shafts 114, 133, therefore, include essentially two sets of circumferential grooves (e.g., twice as many grooves as shaft 135) thereby accommodating both sets of the interleaved parallel belts 112 and 132.

While the preferred embodiment of the invention has been illustrated and described, it will be appreciated that various changes can be made therein without departing from the spirit and scope of the invention.

The invention claimed is:

1. A conveyor system for transporting a stacked product, the conveyor system comprising:
   an infeed conveyor having a distal end, and an upper surface defined by a first plurality of parallel, spaced-apart belts;
   a plurality of lift assemblies disposed below the infeed conveyor, the lift assemblies having a plurality of vertical members positioned and spaced to extend between the first plurality of belts, the lift assemblies being selectively movable between an up position wherein an upper end of the vertical members are disposed above the infeed conveyor, and a down position wherein the upper end of the vertical members are disposed below the upper surface of the infeed conveyor;
   an intermediate conveyor having a proximal end and a distal end, and an upper surface defined by a second plurality of parallel, spaced-apart belts, wherein a portion of the second plurality of belts is interleaved with the first plurality of belts such that the distal end of the infeed conveyor overlaps the proximal end of the intermediate conveyor; and
   an outfeed conveyor oriented transversely to the intermediate conveyor and disposed near the distal end of the intermediate conveyor.

2. The conveyor system of claim 1, wherein the infeed conveyor operates at a first belt speed and the intermediate conveyor operates at a second belt speed, and wherein the second belt speed is greater than the first belt speed.

3. The conveyor system of claim 1, wherein the plurality of lift assemblies further comprises a vertical actuator that selectively moves the associated vertical members between the up position and the down position.

4. The conveyor system of claim 3, wherein the vertical actuators are pneumatically actuated.

5. The conveyor system of claim 1, wherein the lift assemblies are disposed adjacent the proximal end of the intermediate conveyor.

6. The conveyor system of claim 1, further comprising a control system including a plurality of stack detectors and a computer, wherein the computer is adapted to receive signals from the stack detectors and transmit signals to the lift assemblies to instigate movement of the lift assemblies between the up position and the down position.

7. The conveyor system of claim 6, wherein the stack detectors are optical detectors that are disposed below the infeed conveyor belts.

8. The conveyor system of claim 1, further comprising a vertical backstop disposed adjacent the outfeed conveyor.

9. The conveyor system of claim 1, wherein the lift assemblies are adapted to be selectively operable in a ganged configuration to accommodate different sizes of stacks.

10. A method of transferring stacks of product from a first conveyor wherein the stacks are in multiple rows and irregularly spaced onto a second conveyor that is adjacent to a distal end of the first conveyor, such that the stacks are deposited onto the second conveyor in a single row and evenly spaced, the method comprising the steps of:
    detecting a stack as it arrives at a predetermined position on the first conveyor;
    in response to the detected arrival of the stack, selectively elevating the stack above the first conveyor to suspend the stack's conveyed motion;
    determining when a desired open space is available on the second conveyor; and
    lowering the stack onto the first conveyor such that the stack will arrive at the distal end of the first conveyor approximately as the desired open space on the second conveyor arrives, such that the stack is deposited onto the second conveyor at the desired open space.

11. The method of claim 10, wherein the first conveyor comprises a proximal portion having a first plurality of parallel, spaced-apart belts that operate at a first belt speed and a distal portion having a second plurality of parallel, spaced-apart belts that are partially interleaved with the first plurality of belts of the proximal portion, the second plurality of belts having a second belt speed.

12. The method of claim 11, wherein the second belt speed is greater than the first belt speed.

13. The method of claim 12, wherein the stack is selectively elevated with a lift assembly having a plurality of vertical members that extend between the first plurality of belts, the lift assembly being movable between an up position and a down position.

14. The method of claim 13, wherein the lift assembly is selectively moved between the up position and the down position with a pneumatic actuator.

15. The method of claim 13, wherein the second conveyor is oriented transversely to the first conveyor.

16. A conveyor apparatus for conveying product, the conveyor apparatus comprising:
    a first conveyor having a plurality of parallel, spaced belts, wherein the spaced belts are driven at a first belt speed;
    a plurality of lift assemblies disposed below the first conveyor, each of the lift assemblies defining a platform comprising a plurality of parallel members that are positioned between adjacent belts of the first conveyor and an actuator connected to the parallel members, the actuator operable to move the parallel members between an upper position wherein the parallel members extend above the belts of the first conveyor, and a lower position;
    a plurality of detectors, each detector adapted to detect product on the first conveyor that arrives at a particular position;
    a controller operably connected to the plurality of lift assemblies and to the detectors, the controller receiving detection signals from the detectors and providing control signals to the lift assemblies to selectively move the parallel members between the upper position and the lower position;
    a second conveyor having a plurality of parallel, spaced belts, wherein the second conveyor belts are partially interleaved with the first conveyor belts and wherein the second conveyor belts are driven at a second belt speed; and
    a third conveyor disposed near a distal end of the second conveyor and disposed transversely to the second conveyor, the third conveyor being positioned to receive product conveyed by the second conveyor.

17. The conveyor system of claim 16, wherein the second belt speed is greater than the first belt speed.

18. The conveyor system of claim 16, wherein the actuator is pneumatically actuated.

19. The conveyor system of claim 16, wherein the detectors are optical detectors that are disposed below the infeed conveyor belts.

20. The conveyor system of claim 16, further comprising a vertical backstop disposed adjacent the third conveyor.

21. The conveyor system of claim 16, wherein the lift assemblies are adapted to be selectively operable in a ganged configuration to accommodate different sizes of stacks.

* * * * *